United States Patent
Hirose et al.

(10) Patent No.: US 11,256,226 B2
(45) Date of Patent: Feb. 22, 2022

(54) SERVOMOTOR CONTROL DEVICE WITH COUNTERFORCE COMMAND CALCULATION

(71) Applicant: FANUC CORPORATION, Yamanashi (JP)

(72) Inventors: Noboru Hirose, Yamanashi (JP); Keisuke Tsujikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 53 days.

(21) Appl. No.: 16/814,344

(22) Filed: Mar. 10, 2020

(65) Prior Publication Data

US 2020/0310378 A1 Oct. 1, 2020

(30) Foreign Application Priority Data

Mar. 28, 2019 (JP) .............................. JP2019-062383

(51) Int. Cl.
*G05B 19/19* (2006.01)
(52) U.S. Cl.
CPC .... *G05B 19/19* (2013.01); *G05B 2219/34027* (2013.01)
(58) Field of Classification Search
CPC .......... G05B 19/19; G05B 2219/34027; G05B 2219/42092; G05B 2219/41372; H02P 29/40; B23Q 15/00
See application file for complete search history.

(56) References Cited

U.S. PATENT DOCUMENTS 5,230,272 A 7/1993 Schmitz
5,425,237 A * 6/1995 Suer ..................... G05B 19/404
318/611

(Continued)

FOREIGN PATENT DOCUMENTS

JP H05-313745 A 11/1993
JP H07-186076 A 7/1995

(Continued)

OTHER PUBLICATIONS

Iwasaki, Makoto, Masafumi Yamamoto, and Nobuyuki Matsui. "Command shaping for fast and precise positioning considering target position correction." 2007 IEEE/ASME international conference on advanced intelligent mechatronics. IEEE, 2007. (Year: 2007).*

(Continued)

*Primary Examiner* — Michael D Masinick
(74) *Attorney, Agent, or Firm* — Studebaker & Brackett PC

(57) ABSTRACT

Provided are: a position command calculation unit which calculates a position command specifying a target position of a driven body driven by a servomotor; a counterforce command. calculation unit which calculates a counterforce command specifying a target, counterforce which should be received by the driven body; a position acquisition unit which acquires an actual position of the driven body; a position reference drive control unit which generates a position reference drive signal so as to bring the position nearer the target position; a counterforce acquisition unit which acquires a counterforce being received by the driven body; a counterforce reference drive control unit which generates a counterforce reference drive signal so as to bring the counterforce nearer the target counterforce; and a drive signal selection unit which selects either one of the position reference drive signal and the counterforce reference drive signal; in which the position command calculation unit calculates the position command so that the target position becomes a second order or higher relationship relative to time, and the counterforce command calculation unit calculates the counterforce command so that a relationship between the target counterforce and the target position becomes substantially linear.

6 Claims, 5 Drawing Sheets

(56) References Cited

U.S. PATENT DOCUMENTS

| | | | | |
|---|---|---|---|---|
| 6,515,442 B1* | 2/2003 | Okubo | ............... | G05B 19/19 |
| | | | | 318/560 |
| 2002/0192322 A1* | 12/2002 | Tsutsui | ............... | B29C 45/77 |
| | | | | 425/145 |
| 2008/0150181 A1* | 6/2008 | Maruyama | ............ | B29C 45/766 |
| | | | | 264/40.7 |
| 2020/0306865 A1* | 10/2020 | Motohashi | ............ | B25J 9/1633 |

FOREIGN PATENT DOCUMENTS

| JP | 2003-150213 A | 5/2003 |
|---|---|---|
| JP | 2004-144196 A | 5/2004 |
| JP | 2006130533 A | 5/2006 |
| JP | 2008-012588 A | 1/2008 |
| JP | 2016-137526 A | 8/2016 |

OTHER PUBLICATIONS

An Office Action; "Notice of Reasons for Refusal", mailed by the Japanese Patent Office dated May 11, 2021, which corresponds to Japanese Patent Application No. 2019-062383 and is related to U.S. Appl. No. 16/814,344; with English language translation.

* cited by examiner

SERVOMOTOR CONTROL DEVICE WITH COUNTERFORCE COMMAND CALCULATION

This application is based on and claims the benefit of priority from Japanese Patent Application No. 2019-06238, filed on 28 Mar. 2019, the content of which is incorporated herein by reference.

BACKGROUND OF THE INVENTION

Field of the Invention

The present invention relates to a servomotor control device.

Related Art

For example, there are cases where it is desired to accurately control the position. and pressure (counterforce received by driven body) for every time of a driven body such as a die in. press forging. There is concern over the pressure acting on the driven body greatly varying due to a slight difference in conditions such as variation in workpieces, for example. Therefore, technology has been proposed. for driving the driven body using a servomotor capable of detailed feedback control, and controlling the position. of the driven body and the power.

As an example, Patent Document 1 discloses "a servomotor controller comprising: a force detection means to detect a force received from outside by a driven body which is driven by a servomotor; a position command preparation means to prepare a position command. which commands a position of the driven body; a position detection means to detect the position of the driven body; a force command preparation means to prepare a force command which commands to be received by the driven body; a position control processing means to prepare a motor operation command based on position positional deviation obtained from the position command prepared by the position command preparation means and the position detected by the position detection means; a force command processing means to prepare a motor operation command based on a force deviation calculated from the force command prepared by the force command preparation means and the force detected by the force detection means; and a control system selection means to selectively switch between position control which. controls operation of the servomotor in accordance with a motor operation command of the position control processing means, and force control which controls operation of the servomotor in accordance with a motor operation command of the force control processing means, by comparing between the motor operation command prepared by the position control processing means and the motor operation command prepared by the force command processing means, wherein operation of the servomotor is controlled so that the driven body received a force determined in advance when applying a force from outside to the driven body, the servomotor controller further comprising a command correction means to correct a force command prepared by the force command calculation means or a position command prepared by the position command preparation means, in order to change a timing at which the control mode selection means switches between position control and force control".

Patent Document 1: Japanese Unexamined Patent Application, Publication No. 2006-130533

SUMMARY OF THE INVENTION

The controller disclosed in Patent Document 1 controls so that force becomes a desired value in a state in which force is acting from outside of a driven body, and controls so that a position becomes a desired value in a state in which force is not acting from outside on the driven body, and does not control the position of the driven body in a state in which force is acting from outside on the driven body. More specifically, with the technology disclosed in Patent Document 1 there is a possibility of the movement speed of the driven body becoming excessive by driving so that the force of the driven body matches the command value. In particular, in order to improve machining efficiency, in the case of overriding the speed, the risk of the position or force of the driven body deviated from the appropriate values will increase.

For this reason, a servomotor controller has been desired which can accurately control the position of a driven body and the counterforce received by the driven body.

A servomotor control device according to an aspect of the present disclosure includes: a position command calculation unit which calculates a position command specifying a target position at which a driven body driven by a servomotor should be at every time; a counterforce command calculation unit which calculates a counterforce command specifying a target counterforce which should be received by the driven body at every time by driving of the servomotor; a position acquisition unit which acquires an actual position of the driven body; a position reference drive control unit which generates a position reference drive signal to drive the servomotor so as to bring the position acquired by the position acquisition unit nearer the target position; a counterforce acquisition unit which acquires a counterforce actually being received by the driven body; a counterforce reference drive control unit which generates a counterforce reference drive signal to drive the servomotor so as to bring the counterforce acquired by the counterforce acquisition unit nearer the target counterforce; and a drive signal selection unit which selects either one of the position reference drive signal and the counterforce reference drive signal; in which the position command calculation unit calculates the position command so that the target position becomes a second order or higher relationship relative to time, and the counterforce command calculation unit calculates the counterforce command so that a relationship between the target counterforce and the target position becomes substantially linear.

According to the present disclosure, it is possible to provide a servomotor controller which can accurately control the position of a driven body and the counterforce received by the driven body.

DETAILED DESCRIPTION OF THE INVENTION

Figure 1:
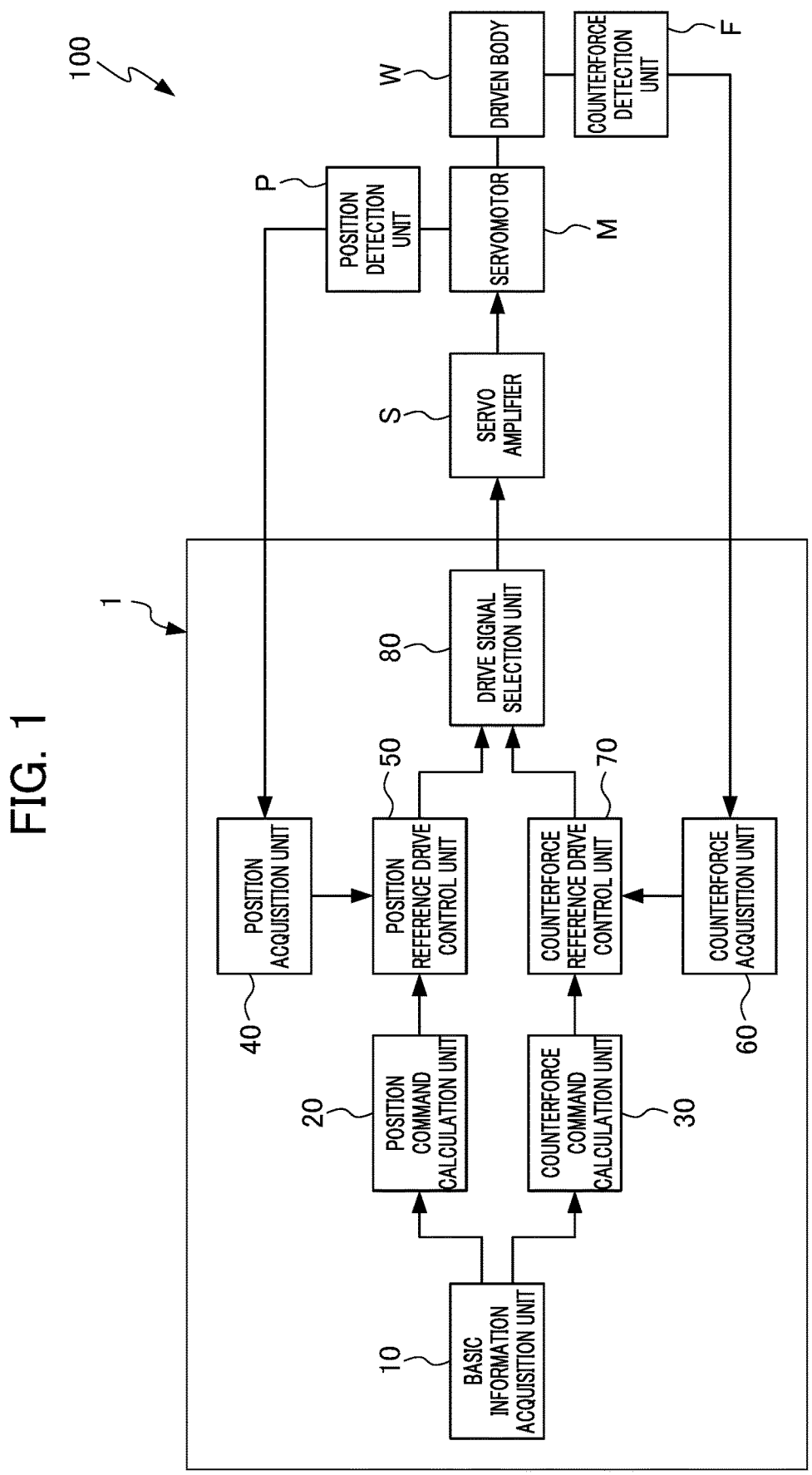
FIG. 1 is a block diagram showing the configuration of a machine tool including a servomotor control device according to an embodiment of the present disclosure.

Hereinafter, an embodiment of the present disclosure will be explained while referencing the drawings. FIG. 1 is a block diagram showing the configuration of a machine tool 100 equipped with a configuration including a servomotor control device 1 according to an embodiment of the present disclosure.

The machine tool 100 in FIG. 1 includes: a driven body (for example, press die) N; servomotor M which drives the driven body N; a servo driver S which supplies drive current to the servomotor M; and a servomotor control device 1 which inputs an operation command to the servo driver S; and has a position detection unit P which detects the position of the driven body W as the rotational position of the servomotor M; and a counterforce detection unit F which detects counterforce received by the driven body W from outside.

The servomotor control device 1 includes: a basic information acquisition unit 10 which acquires an initial position and initial counterforce of the driven body W driven by the servomotor M, as well as an arrival position and arrival counterforce; a position command calculation unit 20 which calculates a position command specifying a target position which the driven. body W should have at every time; a counterforce command calculation unit 30 which calculates a counterforce command that specifies a target counterforce which the driven body 10 should receive by driving of the servomotor M at every time; a position acquisition unit 40 which acquires the actual position of the driven body W; a position reference drive control unit 50 which generates a position reference drive signal for driving the servomotor M so as to bring the position acquired by the position acquisition unit 40 nearer the target position; a counterforce acquisition unit 60 which acquires a counterforce actual being received by the driven body W; a counterforce reference drive control unit 70 which generates a counterforce reference drive signal for driving the servomotor M so as to bring the counterforce acquired by the counterforce acquisition unit 60 nearer the target counterforce; and a control signal selection unit 80 which selects either of a position reference drive signal and a counterforce reference drive signal.

The servomotor control device 1 can be configured by installing the appropriate programs in a computer device having a CPU, memory, etc. The basic information acquisition unit 10, position command calculation unit 20, counterforce command calculation unit 30, position acquisition unit 40, position reference drive control unit 50, counterforce acquisition unit 60, counterforce reference drive control unit 70 and drive signal selection unit 80 of the servomotor control device 1 are distinguished in a functional manner, and may not necessarily be clearly distinguishable in the physical structure and structure of the program.

The basic information acquisition unit 10 can be established as a configuration which analyzes a machining program, and acquires the initial position and initial counterforce (position and counterforce of arrival position and ultimate pressure of previous command) as well as arrival position and arrival counterforce of the driven body W for each command of the machining program, for example.

The position command calculation unit 20 calculates a position command such that the target position for every time of the driven body W becomes at least a second order relationship relative to time, based on the initial position and arrival position of the driven body W acquired by the basic information acquisition unit 10, as well as the designation in the machining program or preset parameters inside of the servomotor control device 1. In other words, the position command calculation unit 20 can be configured so as to calculate the target position x as the second order or higher time function $x(t)=A_n \cdot t^n + A_{n-1} \cdot t^{n-1} + \ldots + A_0 \cdot t^0$. It should be noted that. n is an integer of at least 2, and $A_n$ is the coefficient of each order.

Figure 2:
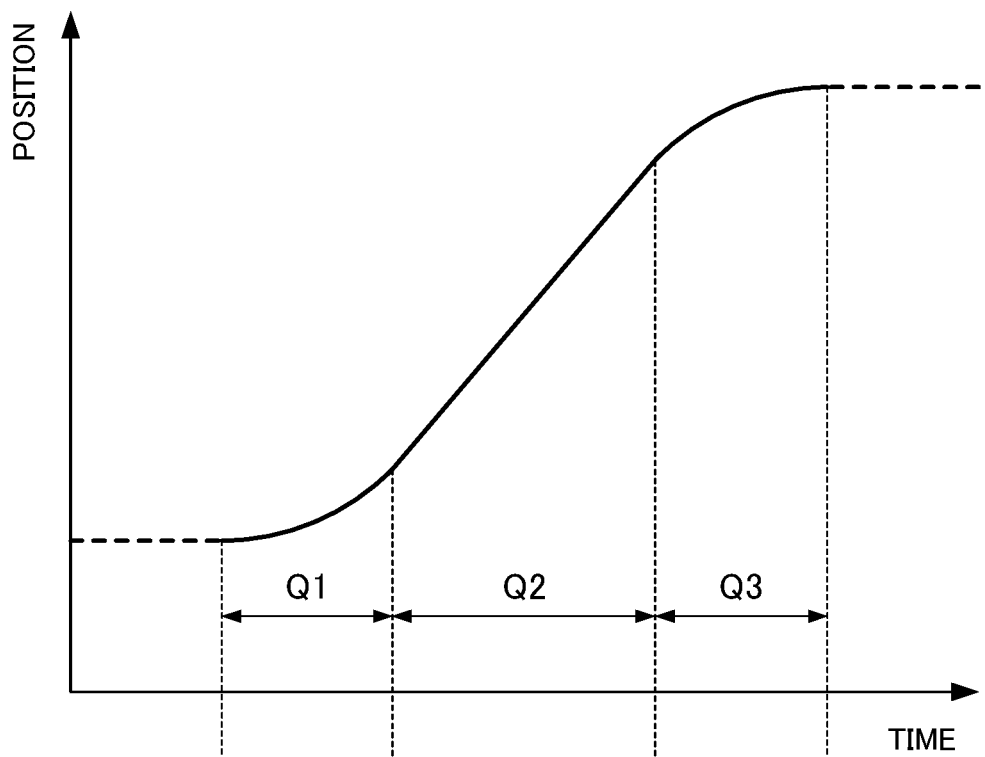
FIG. 2 is a view showing a position command and counterforce command calculated in the servomotor control device of FIG. 1.
Figure 2:
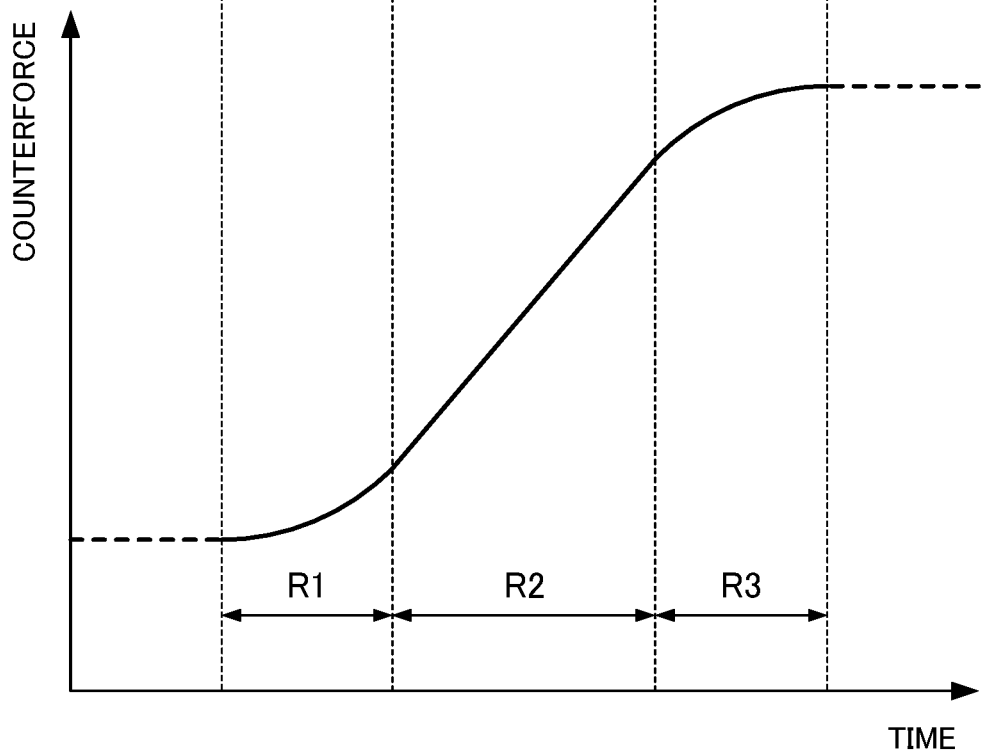

As a specific example, the position command calculation unit 20 can be configured so as to calculate a position command causing the target position to change with time as the second-order time function $x(t)=A_2 \cdot t^2 + A_1 \cdot t + A_0$, as shown in FIG. 2. In this case, the position command can have a first position change time Q1 in which the initial target position is established as a value equal to the initial position, and the second order derivative (acceleration) of the target position is established as constant; a second position change time Q2 in which a first order derivative (speed) of the target position is established as constant ($A_2=0$), after the first position change time Q1; and a third position change time Q3 on which the second order derivative of the target position is established as a value inverse to the first position change time Q1, and a final target position is established as a value equal to the arrival position, after the second position change time Q2. It should be noted that the portion shown by the dotted line in FIG. 2 indicates a state retaining the command value between the previous step and later step.

The appropriate value according to the device configuration. of the machine tool 100, machining target, etc. exists in the values of the second order derivative and first order derivative of the target position in the position command. For this reason, these values are preferably set as values designated in the machining program or values stored in advance in the servomotor control device 1.

Figure 3:
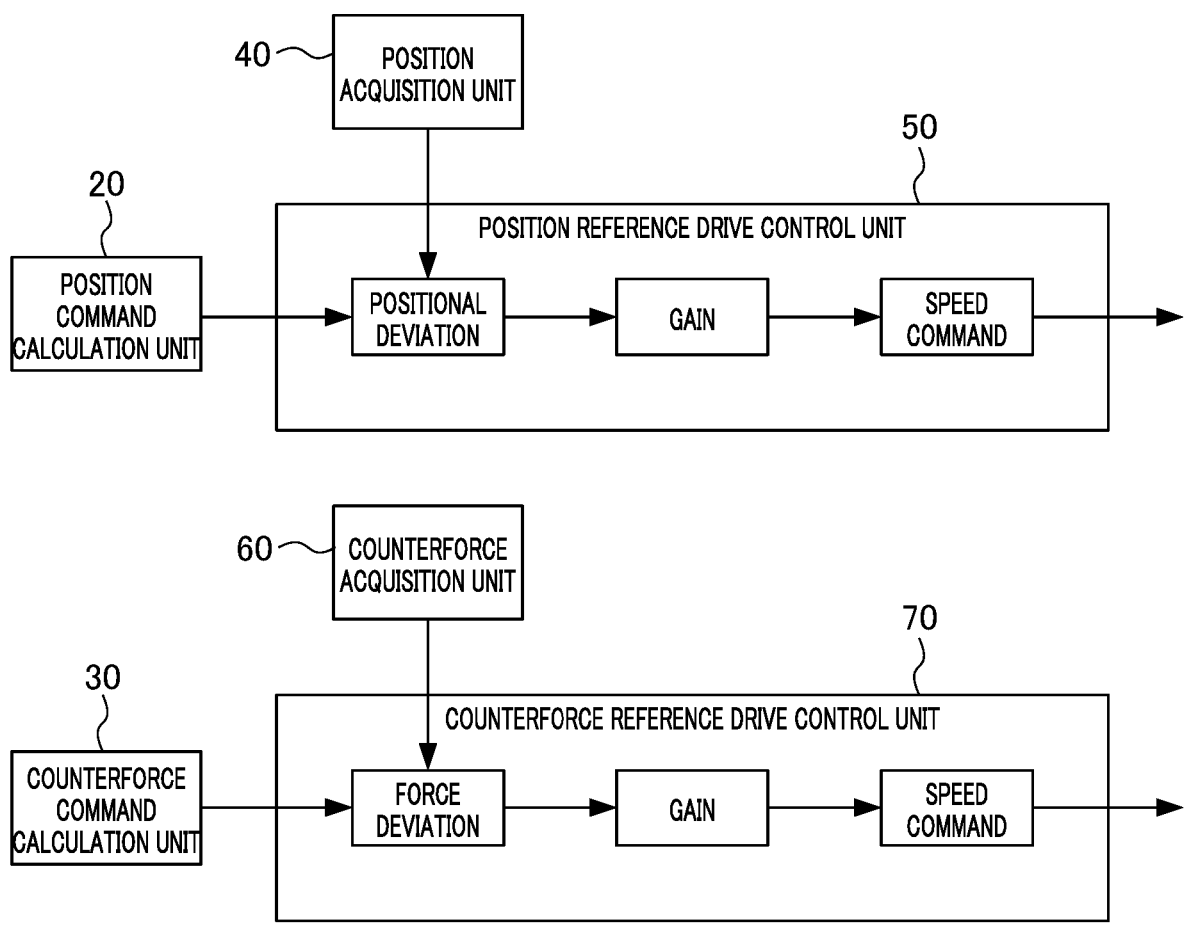
FIG. 3 is a block diagram showing the control of position command and counterforce command of the servomotor control device of FIG. 1.

The counterforce command calculation unit 30 calculates a counterforce command so that the relationship between the target counterforce and target position becomes substantially linear. The correlation coefficient between the time at which reaching the target position and the time at which reaching the target counterforce is preferably at least a proportion of the gain of the position reference drive control unit 50 and the gain of the counterforce reference drive control unit 70 as shown in FIG. 3. By setting the correlation coefficient between the position command and counterforce command as at least the proportion, it is possible to suppress deviation between the target counterforce and counterforce when driving the servomotor M according to the position reference drive signal; and the deviation between the target position and the position when driving the servomotor M according to the counterforce reference drive signal. it is thereby possible to improve the machining quality by retaining both the press pressure and press speed of the machine tool 100 within the appropriate ranges. As the lower limit for the specific numerical value of the correlation coefficient between the position command and counterforce command, 0.90 is preferable, and 0.95 is more preferable.

For this reason, the counterforce command calculation unit 30, similarly to the position command calculation unit 20, calculates a counterforce command. such that the target counterforce for every time of the driven body W becomes at least a second order function, based on the initial counterforce and arrival counterforce of the driven body W acquired by the basic information acquisition unit 10, as well as designation in the machining program or preset parameters inside of the servomotor control device 1. In other words, the counterforce command calculation unit 30 can configure so as to calculate the target counterforce as a time function $y(t)=B_n \cdot t^n + B_{n-1} \cdot t^{n-1} + \ldots + B_j \cdot t^0$ to of the same order as the time function x (t) of the target position x.

As a specific example, the counterforce command calculation unit 30 can be configured so as to calculate the counterforce command. that causes the target counterforce to change with time as the second order time function $y(t)=B_2 \cdot t^2 + B_1 \cdot t + B_0$, as shown in FIG. 2. In this case, the counterforce command Sy can have: a first counterforce change time R1 in which the initial target counterforce is established as a value equal to the initial counterforce, and the second order derivative (acceleration) of the target counterforce is established as constant; a second counterforce change time R2 in which. the first order derivative (speed) or the target counterforce is established as constant ($B_2=0$), after the first counterforce change time R1; and a third counterforce change time R3 in which the second order derivative of the target counterforce is established as a value inverse to the first counterforce change time R1, and the final target counterforce is established as value equal to the arrival counterforce, after the second counterforce change time R2.

The first counterforce change time R1, second counterforce change time R2 and third counterforce change time R3 in this counterforce command are preferably substantially equal to the first position change time Q1, second position. change time Q2 and third position change time Q3 in the position command, and particularly preferably the second counterforce change time R2 of the counterforce command is substantially equal to the second position change time Q2 in the position command. It is thereby possible to establish the relationship between the target counterforce and target position as substantially linear.

As the lower limit in the ratio of the second counterforce change time R2 relative to the second position change time Q2, 0.95 is preferable, and 0.98 is more preferable. On the other hand, as the upper limit in the ratio of the second counterforce change time R2 relative to the second position change time Q2, 1.05 is preferable, and 1.02 is more preferable. By establishing the ratio of the second counterforce change time R2 relative to the second position change time Q2 with at least the lower limit and no more than the upper limit, it is possible to make the relationship between the position command and pressure command as substantially linear, and suppress displacement of the actual position and counterforce relative to the target position and target counterforce.

Figure 4:
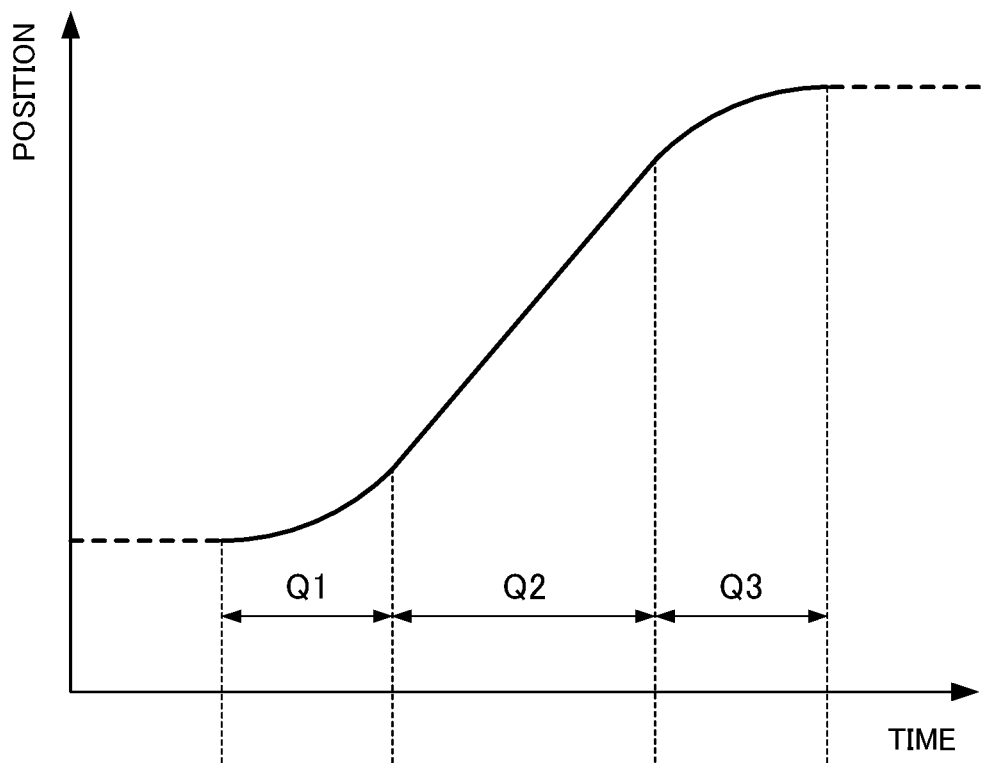
FIG. 4 is a view showing an alternative of position command and counterforce command calculated in the servomotor control device or FIG. 1.
Figure 4:
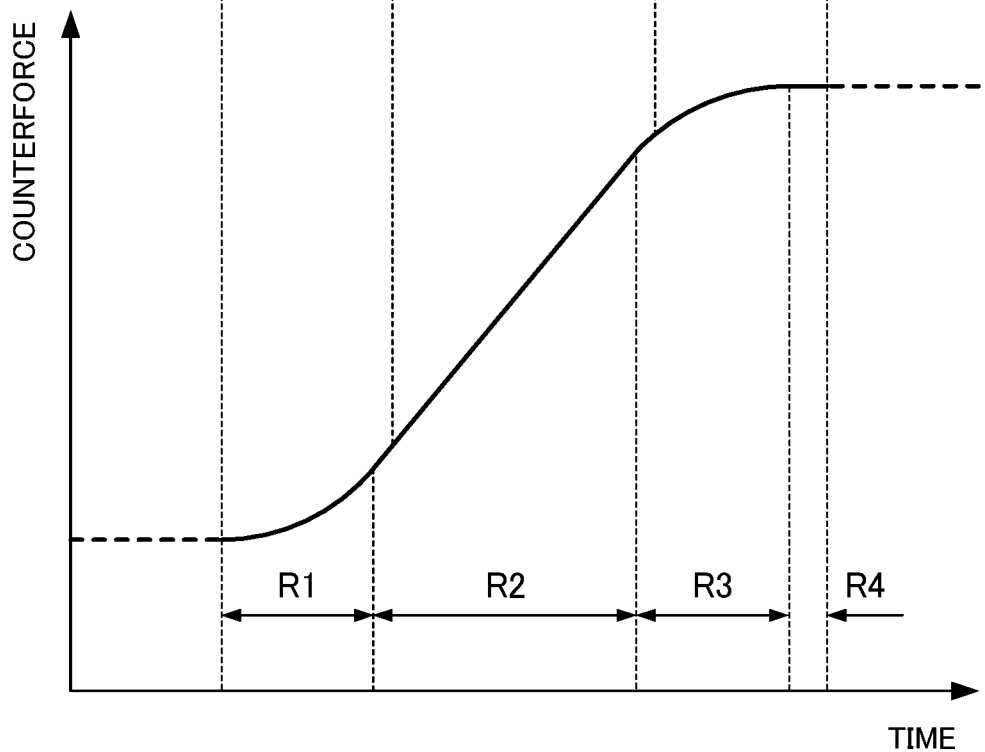

In addition, as shown in FIG. 4, the counterforce command calculation unit 30 may calculate the counterforce command such that the target counterforce reaches the arrival counterforce earlier than the target position of the position command reaching the arrival position, and becomes a constant value. In other words, the counterforce command calculation unit 30 may make the first counterforce change time R1 and third counterforce change time R3 in the counterforce command slightly shorter than the first position change time Q1 and third position change time Q3 in the position command. For this reason, the counterforce command may have a counterforce retention time R4 of retaining the target counterforce at the arrival counterforce, after the third counterforce change time R3, in order to make the overall length of time match the position command.

In order to generate such a counterforce command, it may be configured so as to write in the machining program a ratio of the values of the first counterforce change time R1 and third counterforce change time R3 relative to the first position change time Q1 and third position change time Q3. In this case, the command of the machining program may include a code number indicating the matter of being a command adopting the present embodiment, the arrival position, speed at the second counterforce change time R2, arrival counterforce, and length of the first counterforce change time R1.

In addition, the counterforce command calculation unit 30 may calculate a counterforce command such that the target counterforce reaches the arrival counterforce earlier than the target position in the position command reaches the arrival position, and becomes a constant value, by making the second counterforce change time R2 in the counterforce command slightly shorter than the second position change time Q2 in the position command. In this case, it may be configured so as to write in the machining program a ratio relative to the value of the second counterforce change time R2 or second position change time Q2.

Compared to the feedback control of the position of the driven body W, feedback control of counterforce of the driven body W has a delayed response. For this reason, by the target counterforce in the counterforce command reaching the arrival counterforce earlier than the target position in the position command, since it is possible to compensate for the delay in response of control of counterforce and make the actual position and actual counterforce of the driven body W more linear, it is possible to make the deviation of the actual position and counterforce relative to the target position and target counterforce smaller.

The position acquisition unit 40 acquires a detection value of the position detection unit P. It should be noted that the position detection unit P can be established as a rotary encoder or the like provided to the servomotor M, for example.

The position reference drive control unit 50 generates the position reference drive signal designating the output of the servomotor M, e.g. speed, torque, etc., based on the deviation between the current. target position in the position command and the actual position of the driven body W acquired by the position acquisition unit 40. In other words, the position reference drive control unit 50 performs feedback control to cause the value of the position reference drive signal to change so as to bring the position of the driven body W nearer the target position.

The counterforce acquisition unit 60 acquires the detection value of a counterforce detection unit F. It should be noted that the counterforce detection unit F can be established as a configuration having a strain gauge, for example.

The counterforce reference drive control unit 70 generates a counterforce reference drive signal designating the output of the servomotor N, e.g., speed, torque, etc., based on the deviation between the current target counterforce in the counterforce command and the actual counterforce of the driven body W acquired by the counterforce acquisition unit 60. In other words, the counterforce reference drive control unit 70 performs feedback control to make the value of the counterforce reference drive signal to change so as to bring the counterforce of the driven body W nearer the target counterforce.

The drive signal selection unit 80 considers the value of the position reference drive signal and the value of the counterforce reference drive signal, selects either one of the position reference drive signal and the counterforce reference drive signal, and inputs to the servo driver S. More specifically, the drive signal selection unit 80 can be established as a configuration inputting the one having a smaller value among the position reference drive signal and counterforce reference drive signal to the servo driver S. In addition, the drive signal selection unit 80 may reference past values of the position reference drive signal and counterforce reference drive signal, or other information other than these, in order to determine which of the position reference drive signal and counterforce reference drive signal to select.

Figure 5:
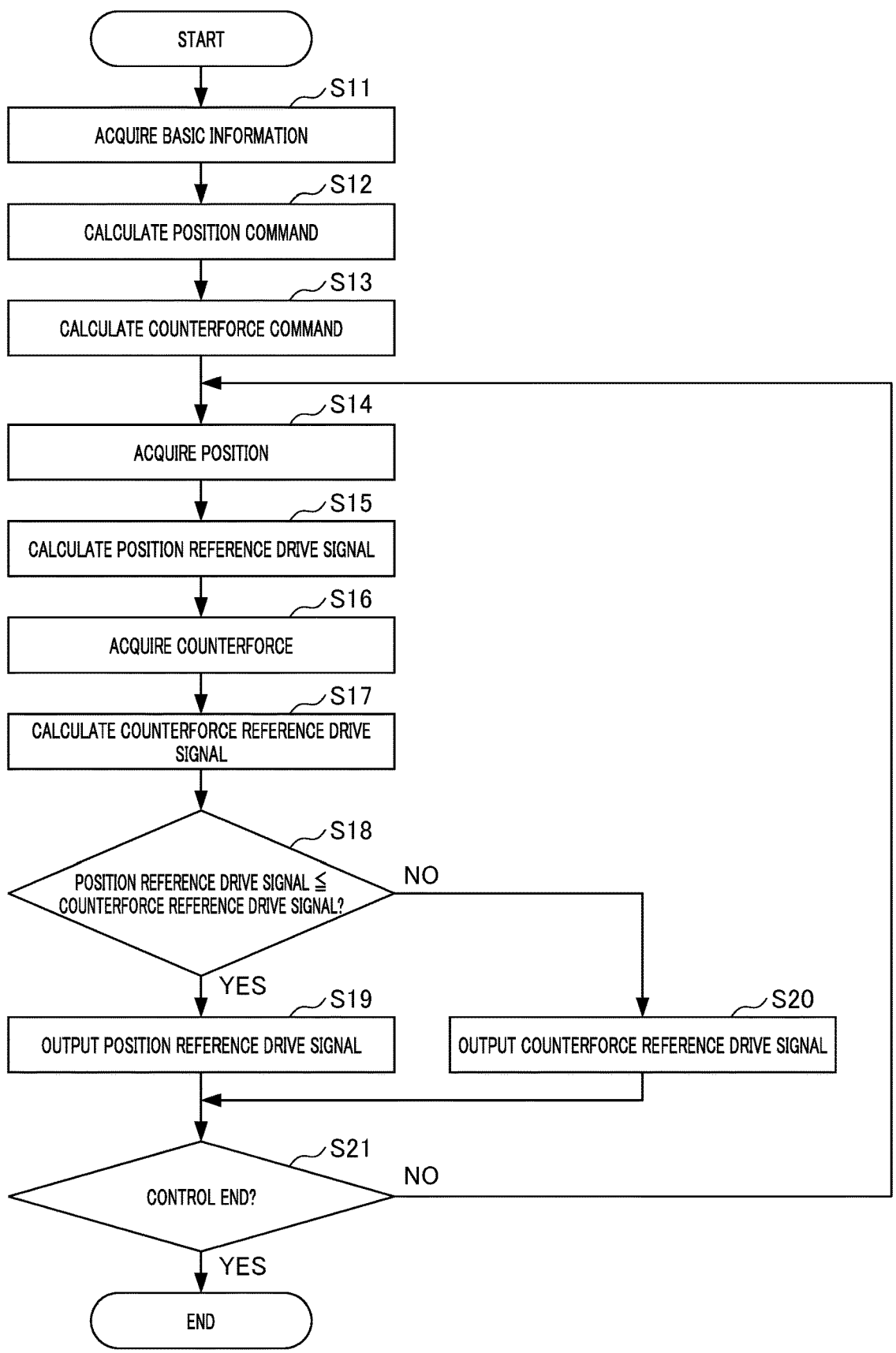
FIG. 5 is a flowchart showing a sequence of control in the servomotor control device of FIG. 1.

FIG. 5 shows a sequence of control of one process of the machine tool 100 in the servomotor control device 1. The servomotor control device 1 includes: a step of acquires basic information including the initial position and initial counterforce of the driven body W, as well as the arrival position and arrival counterforce (Step S11: basic information acquisition step); step of creating a position command specifying the target position of the driven body W for every time (Step S12: position command calculation step); step of creating a counterforce command specifying the target counterforce which the driven body W should receive (Step S13: counterforce command calculation step); step of acquiring the actual position of the drive body W (Step S14: position acquisition step); step of generating a position reference drive signal for driving the servomotor M so as to bring the actual position of the driven body W nearer the target position (Step S15: position reference drive signal generation step); step of acquiring the counterforce actually being received by the driven body 8 (Step S16: counterforce detection step); step of generating a counterforce reference drive signal for driving the servomotor P so as to bring the actual counterforce of the driven body W nearer the target counterforce (Step S17: counterforce reference drive signal generation step); step of comparing the position reference drive signal and the counterforce reference drive signal (Step S18: drive signal comparison step); step of outputting the position reference drive signal to the servo driver S (Step S19: position reference drive signal output step); step of outputting the counterforce reference drive signal to the servo driver S (Step S20: counterforce reference drive signal output step); and step of confirming whether the process of applying the present control has ended (Step S21: end confirmation step).

In the basic information acquisition step of Step S11, the initial position, initial counterforce, arrival position and arrival torque of the driven body W, as well as the information required in order to calculate a position command and a counterforce command are acquired by the basic information acquisition unit 10.

In the position command calculation step of Step S12, the position command to cause the target position to change with time is calculated by the position command calculation unit 20 based on the information acquired in the basic information acquisition step.

In the counterforce command calculation step of Step S13, the counterforce command to cause the target counterforce to change with time so that the relationship with the target position becomes substantially linear is calculated by the counterforce command calculation unit 30 based on the information acquired in the basic information acquisition step.

In the position acquisition step of Step S14, the current position of the driven body W is confirmed by the position acquisition unit 40.

In the position reference drive signal generation step of Step S15, the position reference drive signal for driving the servomotor M so as to decrease the deviation between the current target position in the position command calculated in the position command calculation step and the position of the driven body N confirmed in the position acquisition step is generated by the position reference drive control unit 50.

In the counterforce detection step of Step S16, the current counterforce acting on the driven body W is confirmed by the counterforce acquisition unit 60.

In the counterforce reference drive signal generation step of Step S17, the counterforce reference drive signal for driving the servomotor M so as to decrease the deviation between the current target counterforce in the counterforce command calculated in the counterforce command calculation step and the counterforce of the driven body W confirmed in the position acquisition step is generated by the counterforce reference drive control unit 70.

In the drive signal comparison step of Step S18, it is confirmed whether the value of the position reference drive signal generated in the position reference drive signal generation step is no more than the value of the counterforce reference drive signal generated in the counterforce reference drive signal generation step. In this drive signal comparison step, in the case of the position reference drive signal being no more than the counterforce reference drive signal, the processing advances to the position reference drive signal output step of Step S19, and in the case of the position reference drive signal exceeding the counterforce reference drive signal, the processing advances to the counterforce reference drive signal output step of Step S20.

In the position reference drive signal output step of Step S19, the position reference drive signal generated in the position reference drive signal generation step is outputted. On the other hand, in the counterforce reference drive signal output step of Step S20, the counterforce reference drive signal generated in the counterforce reference drive signal generation step is outputted. In other words, in Steps S18 to S20, the smaller one among the position reference drive signal and the counterforce reference drive signal is selected and outputted to the servo driver S.

In the end confirm step of Step S21, it is confirmed if the process applying the present control has ended, and whether the conclusion of the time of the position command and counterforce command has been reached. In the case of the process applying the present control not ending, i.e. case of a target position not used in the position reference drive signal generation step and a target counterforce not used in the counterforce reference drive signal generation step remaining, the processing returns to Step S14, and this step and later are repeated.

In the above way, the servomotor control device 1 calculates a position command such that becomes at least a second order relationship relative to time in the position command calculation unit 20, and calculates a counterforce command such that the relationship relative to the position command becomes substantially linear in the counterforce command calculation unit 30. The servomotor control device 1 can thereby suppress a difference between the action counterforce acting on the driven body W and the target counterforce in the counterforce command becoming greater, in a case of performing feedback control bringing the actual position of the driven body W nearer the target position in the position command using the position reference drive control unit 50. In addition, the servomotor control device 1 can suppress the difference between the actual position of the driven body W and the target position in the position command from becoming larger, also in a case of performing feedback control bringing the counterforce acting on the driven body W nearer the target counterforce in the counterforce command using the counterforce reference drive control unit 70. This effect is particularly remarkable in the case of performing override to increase the operating speed of the machine tool 100.

Although an embodiment of a servomotor control device according to the present disclosure has been explained above, the servomotor control device according to the present disclosure is not limited to the aforementioned embodiment. In addition, the effects described in the present embodiment are merely listing the most preferred effects produced from the present disclosure, and the effects from the servomotor control device according to the present disclosure are not limited to those described in the present embodiment.

In the servomotor control device according to the present disclosure, the position command and counterforce command may be calculated as any function such as an exponential function or trigonometric function, may be calculated by connecting a plurality of linear functions, or may be calculated by referencing any reference waveform.

EXPLANATION OF REFERENCE NUMERALS 1 servomotor control device
10 basic information acquisition unit
20 position command calculation unit
30 counterforce command calculation unit
40 position acquisition unit
50 position reference drive control unit
60 counterforce acquisition unit
70 counterforce reference drive control unit
80 drive signal selection unit
M: servomotor
W driven body

What is claimed is:

1. A servomotor control device comprising:
   a memory; and
   a processor coupled to the memory, the processer being configured to:
   calculate a position command specifying a target position at which a driven body driven by a servomotor should be at every time;
   calculate a counterforce command specifying a target counterforce which should be received by the driven body at every time by driving of the servomotor;
   acquire an actual position of the driven body;
   generate a position reference drive signal to drive the servomotor so as to bring the acquired position nearer the target position;
   acquire a counterforce actually being received by the driven body;
   generate a counterforce reference drive signal to drive the servomotor so as to bring the acquired counterforce nearer the target counterforce; and
   select either one of the position reference drive signal and the counterforce reference drive signal,
   wherein the processor is configured to calculate the position command so that the target position becomes a second order or higher relationship relative to time, and
   wherein the processor is configured to calculate the counterforce command so that a relationship between the target counterforce and the target position becomes substantially linear.

2. The servomotor control device according to claim 1, wherein a correlation coefficient between a time at which reaching the target position and a time at which reaching the target counterforce is at least a proportion between gain of the position reference drive signal and gain of the counterforce reference drive signal.

3. The servomotor control device according to claim 1, wherein the processor is configured to calculate the target position as a second order or higher time function, and
   wherein the processor is configured to calculate the target counterforce as a time function of the same order as the time function of the target position.

4. The servomotor control device according to claim 1, wherein the processor is configured to calculate the counterforce command so that the target counterforce becomes a constant value earlier than the target position in the position command.

5. The servomotor control device according to claim 1, wherein the processor is further configured to
   acquire an initial position and an initial counterforce of the driven body, as well as an arrival position and an arrival counterforce,
   wherein the processor is configured to calculate the position command to cause the target position to change with time so as to have: a first position change time in which the target position at start is established as a value equal to the initial position, and a second order derivative of the target position is established as constant; a second position change time in which a first order derivative of the target position is established as constant, after the first position change time; and a third position change time in which a second order derivative of the target position is established as a value inverse to the first position change time, and in which the target position at an end is established as a value equal to the arrival position, after the second position change time, and
   wherein the processor is configured to calculate the counterforce command to cause the target counterforce to change with time so as to have: a first counterforce change time in which the target counterforce at start is established as a value equal to the initial counterforce, and in which a second order derivative of the target counterforce is established as constant; a second counterforce change time in which a first order derivative of the target counterforce is established as constant, and which has a length substantially equal to the second position change time, after the first change time; and a third counterforce change time in which the second order derivative of the target counterforce is established as a value inverse to the first counterforce change time, and in which the target counterforce at an end is established as a value equal to the arrival counterforce, after the second counterforce change time.

6. The servomotor control device according to claim 5, wherein the processor is further configured to set the first counterforce change time or the second counterforce change time as a time designed by a program.

* * * * *